UNITED STATES PATENT OFFICE.

EDWARD GOODRICH ACHESON, OF STAMFORD TOWNSHIP, WELLAND COUNTY, ONTARIO, CANADA.

REFRACTORY BODY AND PROCESS OF MAKING THE SAME.

1,014,199. Specification of Letters Patent. Patented Jan. 9, 1912.

No Drawing. Application filed May 27, 1909. Serial No. 498,643.

*To all whom it may concern:*

Be it known that I, EDWARD GOODRICH ACHESON, a citizen of the United States, residing in Stamford township, Welland county, Province of Ontario, Canada, have invented certain new and useful Improvements in Refractory Bodies and Processes of Making Same, of which the following is a specification.

This invention relates to a novel electric furnace product or series of products of refractory character and extreme hardness, such products containing silicon and carbon as essential constituents, but differing in certain highly important respects from the crystallized silicid of carbon known as carborundum.

As is well known, the crystallized silicid of carbon known as carborundum is an extremely hard and rather brittle body consisting essentially of silicon and carbon in proportions corresponding to the formula SiC. This body is produced commercially by heating a mixture of sand and coke, or other form of carbon, by means of an embedded resistor, usually consisting of granular coke. To increase the porosity of the charge sawdust is commonly added, and it is also customary to add sodium chlorid, whereby the elimination of iron is facilitated.

I have now discovered that under certain conditions it is possible to obtain a product which contains silicon and carbon, and may perhaps consist essentially of these elements in substantially or even precisely the proportions in which they exist in carborundum, this new product differing however in essential respects, and particularly in certain physical characteristics, from carborundum. The distinction which I regard as most important and most characteristic of the novel product is in respect to its greater toughness or lesser degree of brittleness, in which respect it far excels carborundum. This novel product is formed by a reaction occurring in the electric furnace between sand or equivalent silicious material and carbon, in presence of an element or compound capable of modifying the reaction to such degree or in such manner that the product acquires the essential physical characteristic of increased toughness as compared with carborundum. As an example of its production I will describe the following: A mixture was prepared consisting essentially of pure silica sand and carbon commingled in the proportions theoretically required for the production of silicid of carbon, that is to say in the proportion of 62.7 parts of sand to 37.3 parts of carbon. To this mixture was added a second mixture consisting essentially of boric acid from which most of the water of crystallization had been expelled, and carbon, the boric acid and carbon being in the approximate proportions of 210 parts of $B_2O_3$ to 120 parts of carbon. These two mixtures were thoroughly commingled in various proportions, the proportions in one specific instance being 92 parts of the silica mixture to 8 parts of the boric acid mixture. The resulting mass was heated in an electric furnace of the resistance type, being disposed in proximity to the resistor and carefully shielded from the action of the air. The temperature was approximately that required for the production of carborundum, and was maintained for several hours. At the close of the operation the product was found to consist in part of a crystalline material, much of which presented the appearance of plates of considerable size with very thin and sharp edges, clearly distinguishable from the comparatively blunt edges of typical carborundum crystals. The material was black in color or nearly so, and did not in this instance exhibit the iridescent coloring which is often characteristic of carborundum. The hardness of the new product is at least equal to and perhaps greater than that of carborundum. The specific gravity of one specimen of the product in the form of highly developed crystals was 3.246, closely approximating that of carborundum. The temperatures of formation and decomposition of the product appear to be similar to those for carborundum. Upon decomposition at high temperatures a residue of graphite remained. The product was also observed in the form of masses wherein no crystalline structure was apparent, these masses being very dense in character and presenting the appearance of having undergone at least partial fusion.

The most striking and salient characteristic of the product, both in the crystalline and massive forms, is, as above stated, its toughness as compared with carborundum. This characteristic toughness of the material, in conjunction with its extreme hardness indicates abrasive qualities of exceptional value.

Boron may enter into the product of the furnace operation, but whether in case it so enters it exists in chemical combination with the silicon and carbon, or as a carbid of boron in admixture with silicid of carbon, or in admixture therewith in other form or combination, is not at present known. It appears probable however from the results obtained that the product may be entirely or substantially free from boron either in combination or admixture, and may yet exhibit in a high degree those valuable properties above noted and those characteristics which distinguish it from carborundum, such properties and characteristics being presumably in this case due to the modifying influence, during the reaction, either of the boric anhydrid or of the products of reduction thereof. In such case it is reasonable to suppose that other bodies may prove capable of exerting a like favorable effect upon the toughness of the product.

I claim:

1. The herein described novel product, containing as essential constituents silicon and carbon, and characterized by a degree of toughness exceeding that of carborundum.

2. The process which consists in disposing in proximity to a resistor a charge containing a silicious material, carbon and a compound of boron, the compound of boron in less proportion than the silicious material, and effecting reduction of the same by heat developed in said resistor by the passage therethrough of an electric current, thereby producing a material containing as essential constituents silicon and carbon, and characterized by a degree of toughness exceeding that of carborundum.

In testimony whereof, I affix my signature in presence of two witnesses.

EDWARD GOODRICH ACHESON.

Witnesses:
W. H. ARISON,
EBEN C. SPEIDEN.